Dec. 14, 1948.  W. K. CRESON ET AL  2,456,390
STEERING GEAR
Filed Nov. 7, 1945
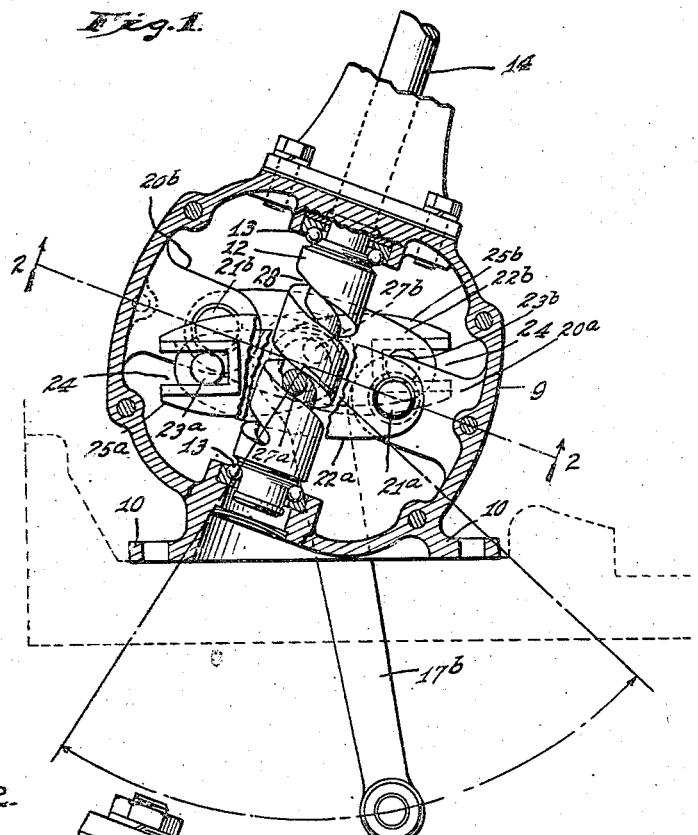
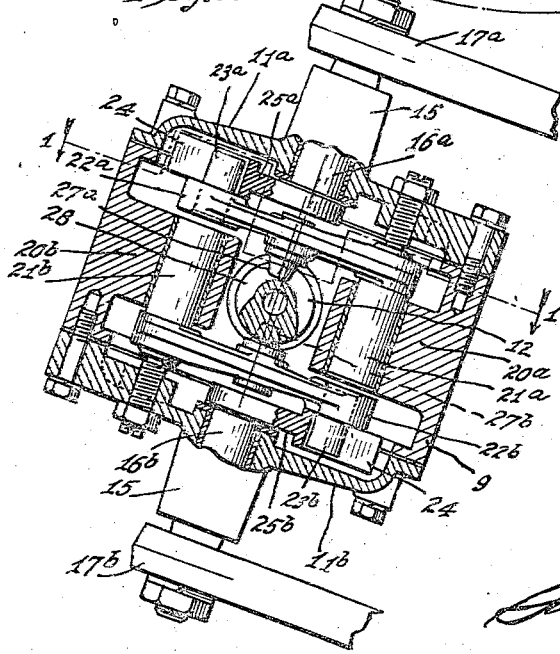
INVENTORS.
WILLIAM K. CRESON and
BY ROLLIE H. JORDAN,
ATTORNEYS.

Patented Dec. 14, 1948

2,456,390

UNITED STATES PATENT OFFICE 2,456,390

STEERING GEAR

William K. Creson and Rollie H. Jordan, La Fayette, Ind., assignors to Ross Gear & Tool Company, La Fayette, Ind., a corporation of Indiana Application November 7, 1945, Serial No. 627,204

9 Claims. (Cl. 74—497)

Our invention relates to steering gears of a type suitable for use in automotive vehicles. In certain respects, the invention is particularly concerned with a steering gear embodying a pair of swinging arms independently connectible respectively to two dirigible wheels of a vehicle; but certain features of the invention are useful in a steering gear having a single arm connectible to two dirigible wheels.

It is an object of our invention to produce a twin-arm steering gear embodying a pair of swinging arms adapted for independent connection to dirigible vehicle-wheels. A further object of our invention is to produce a twin-arm steering gear in which both arms will swing in opposite directions about a common axis. Still another object of the invention is to simplify the construction of twin-arm steering gears.

It is also our object to decrease the ratio between movement of the steering wheel and movement of the dirigible vehicle-wheels without unduly sacrificing irreversibility of the steering gear as a whole.

In carrying out our invention in its preferred form, we employ a generally helical cam adapted to be rotated by the steering wheel of the vehicle. Associated with such cam is a cam-following lever mounted for swinging movement about an axis offset from the cam axis in a plane normal thereto. A rock-shaft, mounted on an axis parallel to that of said lever, bears a steering arm and a connecting arm, the latter operatively connected to said lever at a point which is spaced a greater distance from the lever-axis than from the axis of the rock-shaft, so that angular movement of the rock-shaft will be greater than angular movement of the lever. In twin-arm steering gears, we provide two rock-shafts each bearing a steering arm and each operatively connected to the cam through its own connecting arm and lever, such two rock-shafts desirably being disposed on a common axis coplanar with and normal to the cam-axis.

In the accompanying drawing, which illustrates a preferred embodiment of the invention, Fig. 1 is a side elevation in partial section on the line 1—1 of Fig. 2, and Fig. 2 is an end elevation in partial section on the line 2—2 of Fig. 1.

The structure illustrated in the drawing includes a housing 9 provided with ears 10 by which the housing is adapted for attachment to the frame of a vehicle. The housing 9 has opposite open sides covered respectively by similar cover plates 11a and 11b. Extending diametrically across the housing parallel to and midway between the cover plates is a cam 12 supported through suitable bearings 13 from the housing-walls and rotatable with a manually operated steering shaft 14. The cover plates 11a and 11b are provided with bosses 15 within which there are respectively mounted two rock-shafts 16a and 16b bearing at their outer ends steering arms 17a and 17b adapted for operative connection respectively to two dirigible wheels of the vehicle. The two rock-shafts 16a and 16b have a common axis which is coplanar with and perpendicular to the axis of the cam 12.

On opposite sides of the cam 12, the housing 10 is provided interiorly with a pair of inwardly extending bosses 20a and 20b. Such bosses rotatably receive spindles 21a and 21b rigid with arms 22a and 22b which extend across and beyond the cam 12. At their free ends, the arms 22a and 22b are provided with pins 23a and 23b received in radial slots 24 in arms 25a and 25b, which are rigid respectively with the rock-shafts 16a and 16b. The arms 22a and 22b are provided with bosses 27a and 27b which are received within a single, generally helical groove 28 in the cam 12.

The arms 22a and 22b are identical in all material respects. The axes of the spindles 21a and 21b are spaced at equal distances from the axis of the cam 12 are located in a common plane normal to such cam-axis. The distances of he boss 27a and of the pin 23a from the axis of the spindle 21a are respectively equal to the distances of the boss 27b and of the pin 23b from the axis of the spindle 21b.

It will be obvious from the construction described that rotation of the cam 12 will cause the two arms 22a and 22b to swing in opposite directions about the axes of their respective spindles. Because of the presence of the pins 23a and 23b in the slots 24 of the arms 25a and 25b, the rock-shafts 16a and 16b will likewise be swung in opposite directions. The cam groove 28 has a uniform effective pitch—that is, it is so shaped that the angle through which the cam 12 rotates will bear a constant ratio to the angle through which each of the arms 22a and 22b rotates. However, the operative connection between each arm 22a or 22b and its associated rock shaft, 16a or 16b, is of such a nature that the ratio of the angular movements of the arm and rock shaft is not constant. Specifically, the amount of angular movement of a rock-shaft produced by any given angular movement of its associated arm decreases as the arm moves toward either end of its range of movement from a central position in which it lies in a plane normal to the axis of the cam 12.

Owing to the fact that each pin 23a or 23b lies on the opposite side of the cam from the axes of the associated spindle 21a or 21b, each of the arms 22a and 22b is a lever of the third class, and angular movement of each rock-shaft will exceed angular movement of the associated arm. As a result, the pitch of the cam groove 28 may be made fine enough to provide effective irreversibility without objectionably increasing the ratio between movement of the steering wheel and movement of the steering arms 17a and 17b. The interposition of the arms 22a and 22b between the cam and the rock-shafts makes it possible to dispose the rock-shafts in the desired coaxial relationship.

While we have described the cam groove 28 in the construction illustrated as of constant effective pitch, and while we believe that in most instances such a pitch will prove preferable, it is not essential that the pitch be constant. However, if the cam does not have a constant effective pitch the rock shafts 21a and 21b will not have equal velocities at all points in their range of movement; because the two bosses occupy different portions of the cam groove.

We claim as our invention:

1. In a steering gear, a rotatable cam provided with a generally helical cam groove, a pair of levers pivoted respectively on parallel axes located on opposite sides of and equally spaced from the axis of said cam, a pair of rock shafts disposed on a common axis perpendicular to and coplanar with the cam-axis, and adapted for independent connection to dirigible vehicle wheels, said levers extending past and on opposite sides of said cam and being provided respectively with bosses slidably received in the cam groove, said bosses being equally spaced from the axes of their respective levers, arms rigid respectively with said rock shafts and extending in opposite directions therefrom into association with the free ends of said levers, and means operatively interconnecting the free end of each lever with its associated arm.

2. The invention set forth in claim 1 with the addition that said means comprises a pin projecting from each lever near the free end thereof, each of said arms being provided with a generally radial slot receiving the pin on the associated lever, the distances between the pins and the axes of their respective levers being equal.

3. In a steering gear, a rotatable cam provided with a generally helical cam groove, a pair of levers pivoted respectively on axes located on opposite sides of and equally spaced from the axis of said cam, a pair of rock shafts disposed in a common plane perpendicular to the cam-axis and adapted for independent connection to dirigible vehicle wheels, said levers extending past and on opposite sides of said cam and being provided respectively with bosses slidably received in the cam groove, said bosses being equally spaced from the axes of their respective levers, arms rigid respectively with said rock shafts and extending in opposite directions therefrom into association with the free ends of said levers, and means operatively interconnecting the free end of each lever with its associated arm.

4. In a steering gear, a rotatable cam provided with a generally helical cam groove, a pair of levers pivoted respectively on parallel axes located on opposite sides of and equally spaced from the axis of said cam, a pair of rock shafts disposed on a common axis perpendicular to and coplanar with the cam-axis and adapted for independent connection to dirigible vehicle wheels, said levers being provided respectively with bosses which are received in said cam groove and which are equally spaced from the respective lever-axes, and means operatively connecting said levers respectively with said rock shafts.

5. In a steering gear, a rotatable cam provided with a generally helical cam groove, a pair of levers pivoted respectively on axes located on opposite sides of and equally spaced from the axis of said cam, a pair of rock shafts disposed in a common plane perpendicular to the cam-axis and adapted for independent connection to dirigible vehicle wheels, said levers being provided respectively with bosses which are received in said cam groove and which are equally spaced from the respective lever-axes, and means operatively connecting said levers respectively with said rock shafts.

6. In a steering gear, a rotatable, generally helical cam, a pair of levers pivotally mounted on opposite sides of said cam and operatively connected thereto to be swung about their respective axes when said cam is rotated, the axes of pivotal movement of said levers being on opposite sides of said cam a pair of rock shafts located in a common plane perpendicular to the cam axis and adapted for independent connection to dirigible vehicle wheels, and means operatively connecting said levers respectively with said rock shafts.

7. In a steering gear, a rotatable, generally helical cam, a pair of levers pivotally mounted on opposite sides of said cam and operatively connected thereto to be swung about their respective axes when said cam is rotated, the axes of pivotal movement of said levers being on opposite sides of said cam a pair of rock shafts located in a common plane with the cam axis and adapted for independent connection to dirigible vehicle wheels, and means operatively connecting said levers respectively with said rock shafts.

8. In a steering gear, a rotatable, generally helical cam, a lever pivoted on an axis offset from the cam-axis and operatively connected to the cam to be swung by rotation of the cam, a rock shaft mounted on an axis parallel to but offset toward the cam-axis from the axis of said lever and adapted for connection to a dirigible vehicle wheel, an arm on said rock shaft, and a pin on said lever spaced from the axis thereof, said arm being provided with a radial slot receiving said pin, said rock-shaft axis being disposed between the axis of said lever and said pin.

9. In a steering gear, a rotatable, generally helical cam, a lever pivoted on an axis offset from the cam-axis and operatively connected to the cam to be swung by rotation of the cam, a rock shaft mounted on an axis parallel to but offset toward the cam-axis from the axis of said lever and adapted for connection to a dirigible vehicle wheel, an arm on said rock shaft, and means operatively interconnecting said lever and arm, said rock-shaft axis being disposed between the axis of said lever and the point of interconnection of said lever and arm.

WILLIAM K. CRESON.
ROLLIE H. JORDAN.

REFERENCES CITED

The following references are of record in the file of this patent:

UNITED STATES PATENTS

| Number | Name | Date |
| --- | --- | --- |
| 1,723,537 | Wright | Aug. 6, 1929 |

FOREIGN PATENTS

| Number | Country | Date |
| --- | --- | --- |
| 442,414 | France | June 20, 1912 |
| 480,054 | Great Britain | Feb. 16, 1938 |